United States Patent
Chan

(10) Patent No.: US 8,025,453 B2
(45) Date of Patent: Sep. 27, 2011

(54) MULTI-FUNCTIONAL CLEANING AND NEATENING TOOL

(76) Inventor: Yi-Chang Chan, San Chung (TW)

(*) Notice: Subject to any disclaimer, the term of this patent is extended or adjusted under 35 U.S.C. 154(b) by 752 days.

(21) Appl. No.: 12/217,454

(22) Filed: Jul. 2, 2008

(65) Prior Publication Data

US 2010/0000038 A1 Jan. 7, 2010

(51) Int. Cl.
*B43K 5/00* (2006.01)

(52) U.S. Cl. .................. 401/202; 401/188 R; 401/262; 401/266

(58) Field of Classification Search .......... 401/6, 188 R, 401/196, 202, 205, 262, 263, 265, 266
See application file for complete search history.

(56) References Cited

U.S. PATENT DOCUMENTS

| 5,397,194 | A | * | 3/1995 | Yuan et al. | 401/266 |
| 5,988,923 | A | * | 11/1999 | Arai | 401/262 |
| 6,036,391 | A | * | 3/2000 | Holliday et al. | 401/188 R |

* cited by examiner

*Primary Examiner* — Tuan Nguyen
(74) *Attorney, Agent, or Firm* — Pro-Techter Int'l Services; Ralph Willgohs

(57) ABSTRACT

A multi-functional cleaning and neatening tool includes a body which is easy to carry and operate. Below the body is connected with a wipe board. In a normal day, a bottom lid is covered on the wipe board and can be removed when cleaning or neatening an automobile. In collaboration with different cleaning solution in the body and the wipe board of a variety of material, scratches on a body or glass of the automobile can be dealt with, the automobile can be waxed or washed with bubbles.

6 Claims, 3 Drawing Sheets

MULTI-FUNCTIONAL CLEANING AND NEATENING TOOL

BACKGROUND OF THE INVENTION a) Field of the Invention

The present invention relates to a multi-functional cleaning and neatening tool, and more particularly to a simple tool by which scratches on a body and glass of an automobile can be removed, as well as the automobile can be waxed or washed with bubbles.

b) Description of the Prior Art

There are a lot of tools to neaten and clean an automobile, such as a tool by which scratches on a body and glass of the automobile can be removed, a too by which the automobile can be waxed or a tool by which the automobile can be washed with bubbles. As the aforementioned tools are only provided with a single function, in addition to being large in size that they are not easy to carry and collect, a car owner has to possess a plurality of tools at a same time that space will be occupied and money will be wasted.

SUMMARY OF THE INVENTION

The primary object of the present invention is to provide a light and easily operating cleaning and neatening tool specifically used for an automobile, such that a car owner can add different cleaning solution in a body of the tool according to requirement of the auto body, along with various wipe boards, to deal with scratches on the body and glass on the automobile, wax the automobile or wash the automobile with bubbles.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
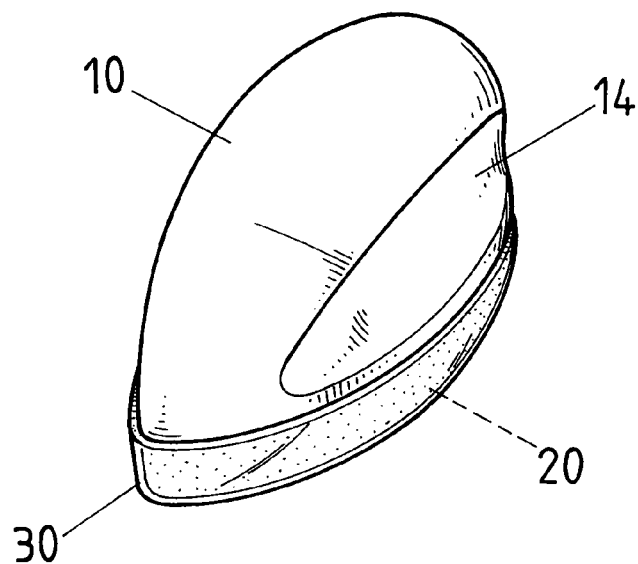
FIG. 1 shows an elevational cutaway view of the present invention.
Figure 2:
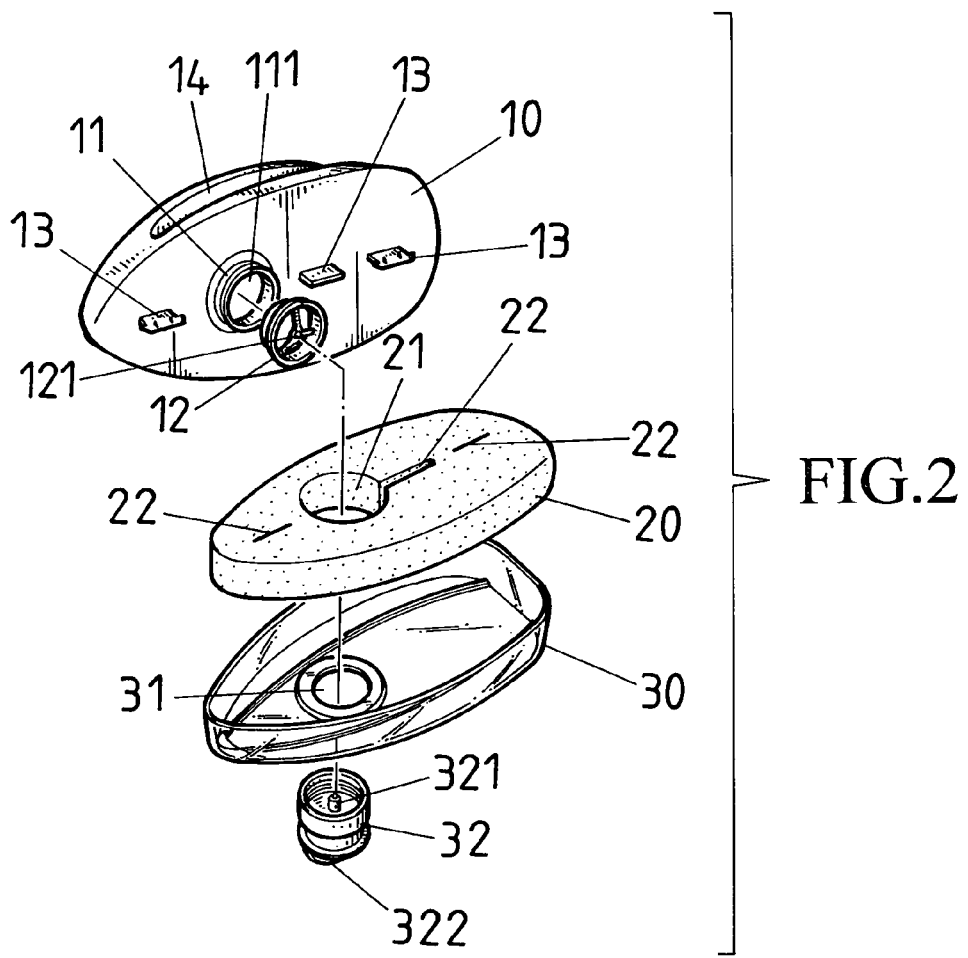
FIG. 2 shows a perspective view of components of the present invention.
Figure 3:
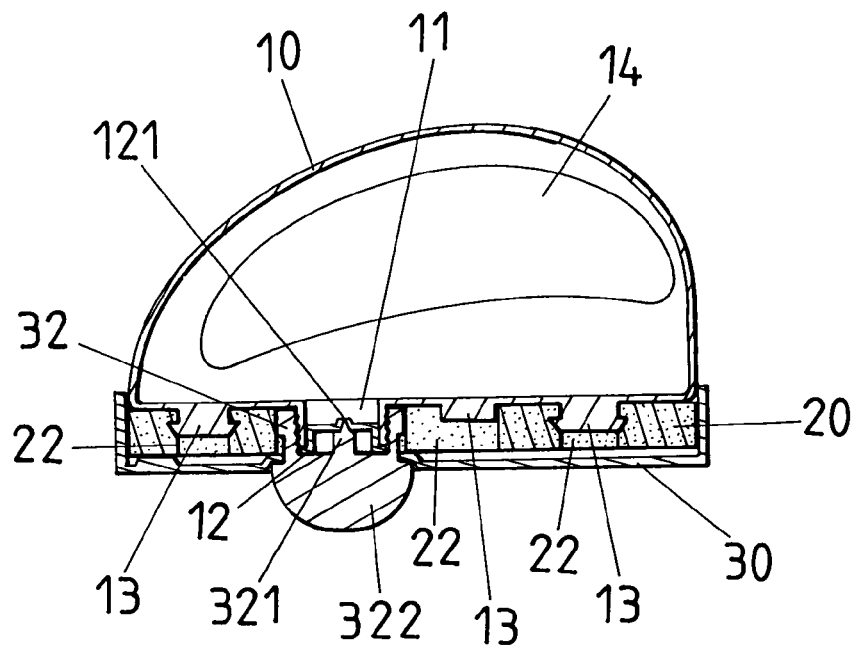
FIG. 3 shows a cutaway view of the present invention.

Referring to FIGS. 1 to 3, the present invention is constituted by a body 10, a wipe board 20 and a bottom lid 30. Bottom of the body 10 is provided with at least one stud 11 that is protruded outward, interior of the stud 11 is provided with an opening 111 into which a cork 12 can be installed, interior of the cork 12 is provided with a fill hole 121, peripheries of the stud 11 are provided with at least one locking block 13, and two sides of the body 10 are provided respectively with a symmetric groove 14.

Interior of the wipe board 20 which is at bottom of the body 10 is provided with a through-hole 21 surrounding outside the stud 11 of body 10, peripheries of the through-hole 21 are provided with slots 22 to be engaged with the locking blocks 13 on the body 10.

The bottom lid 30 is covered on the wipe board 20, with bottom thereof being provided with a latch hole 31 to be latched with a nut 32. A center inside the nut 32 is provided with a water-proof pillar 321, an exterior side of the nut 32 is provided with a knob 322, the nut 32 can be locked on the stud 11 of body 10 by rotating the knob 322, and the water-proof pillar 321 can block the fill hole 121 inside the cork 12 of body 10 (as shown in FIG. 3), so as to prevent liquid in the body 10 from leaking out.

Figure 4:
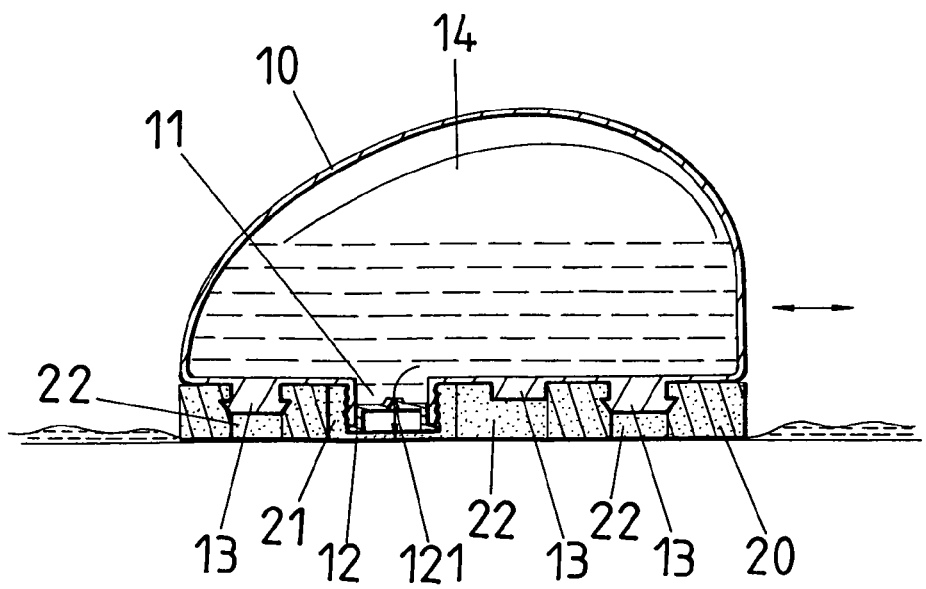
FIG. 4 shows a cutaway schematic view of motion of the present invention.

Referring to FIG. 4, the knob 322 is rotated to loosen the nut 32 from the stud 11 of body 10, such that the bottom lid 30 can be taken out. A user will then use a hand to grip the two grooves 14 of body 10, and use the wipe board 20 to operate on a body or glass of the automobile; whereas, the liquid inside the body 10 will flow to the wipe board 20 from the fill hole 121 of cork 12, so as to be smeared on the body or glass of the automobile.

Figure 5:
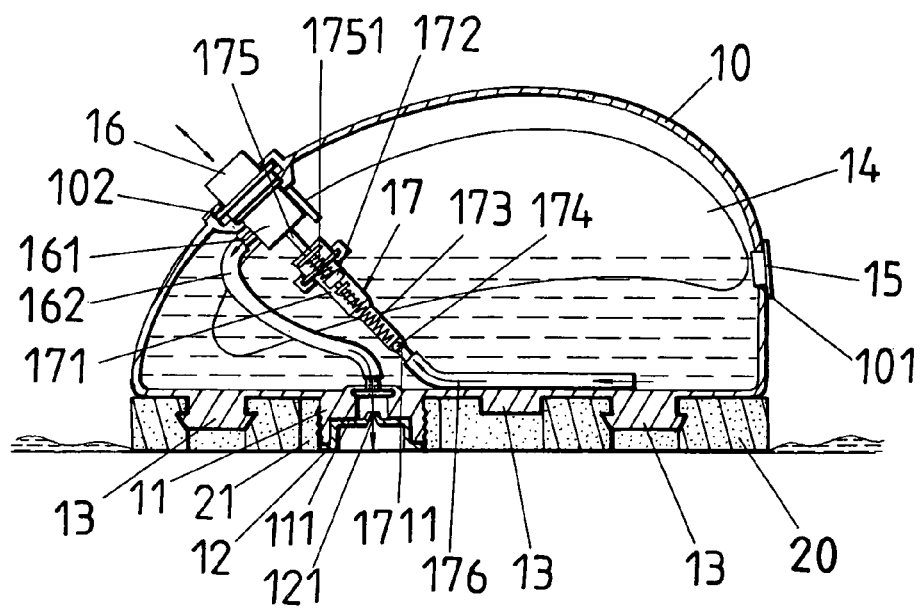
FIG. 5 shows a cutaway schematic view of motion in accordance with a preferred embodiment of the present invention.

Referring to FIG. 5, interior of a concaved hole 101 at an end of the body 10 is engaged with a water-proof plug 15. Cleaning solution can be filled into the body 10 from the concaved hole 101 when the water-proof plug 15 is pulled out. Interior of a concaved hole 102 at the other end of body 10 is provided with an indenter 16, an end of the indenter 16 is extended into the body 10 to connect with a lift pump 17 which includes a lift seat 171, a lift head 172, a spring 173, a steel ball 174 and a water pipe 175. Interior of the lift seat 171 which is in a pipe shape is provided with the lift head 172; a lower end of the lift head 172 is sheathed with the spring 173; bottom of the spring 173 is connected with the steel ball 174 which blocks at a cone-shape opening 1711 at a bottom end of the lift seat 171; below the opening is sheathed with an inlet pipe 176; an end of the water pipe 175 is extended into the lift seat 171 and can be transfixed with a spring 1751, followed by penetrating the lift head 172 to compress the other spring 173; the other end of water pipe 175 is protruded out of the lift seat 171 and can be connected to interior of the indenter 16; and a connector 161 at a side of the indenter 16 can be sheathed with an outlet pipe 162 which is connected to the fill hole 121 inside the cork 12 of body 10.

When the indenter 16 is compressed and released, the water pipe 175 will be driven to compress and release the springs 1751, 173 to draw the liquid. The liquid inside the body 10 will then be sucked into the water pipe 175 through the inlet pipe 176, and will enter into the outlet pipe 162 of the indenter 16, followed by flowing into the fill hole 121 inside the cork 12. Therefore, the liquid in the body 10 will flow into the wipe board 20 by compressing and releasing repeatedly as described above.

Figure 6:
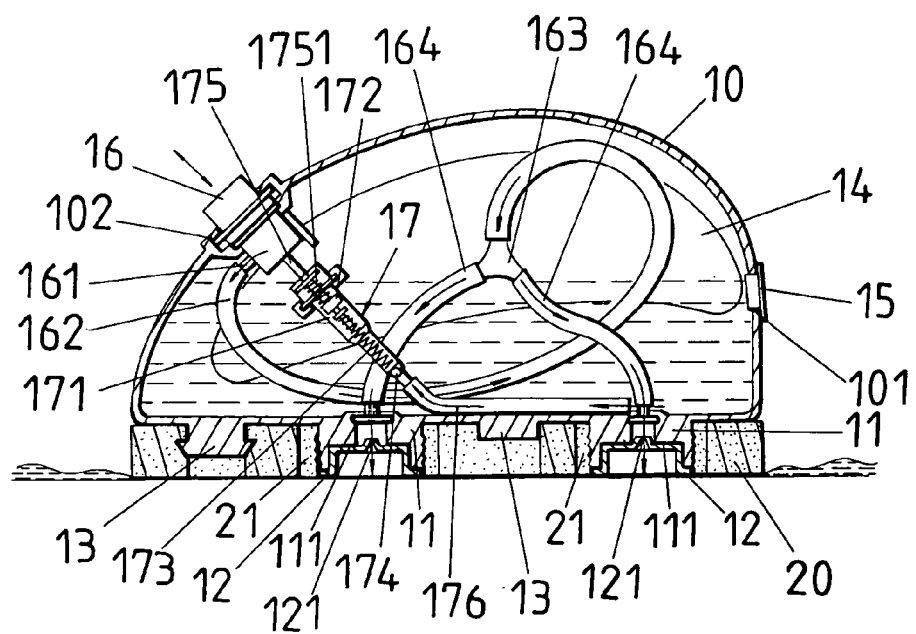
FIG. 6 shows a cutaway view of motion in accordance with another embodiment of the present invention.

Referring to FIG. 6, two studs 11 are protruded outward at the bottom of body 10, the interior of opening 111 inside each stud 11 is provided with the cork 12, and two through-holes 21 on the wipe board 20 surround respectively outside the stud 11 of body 10. A tail end of the outlet pipe 162 at the indenter 16 of lift pump 17 inside the body 10 is then connected with a three way pipe 163 which is branched into two outlet pipes 164 to connect to the fill holes 121 in two corks 12 of body 10, thereby forming a cleaning and neatening device wherein two streams of cleaning liquid are filled into the wipe board 20.

Accordingly, the interior of body 11 can be filled with different liquid according to various needs, such as that as detergent to remove scratches on the body or glass of the automobile is different from detergent to bubble-wash or wax the automobile, the associated wipe board 20 will have a different material.

Accordingly, the present invention is the light and easy to carry or wipe tool specifically used for the automobile, which can deal with the scratches on the body or glass of the automobile, or can be used to wax or bubble-wash the automobile, in association with a variety of cleaning solution and wipe board.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A multi-functional cleaning and neatening tool, comprising a body, bottom of which is provided with at least one stud, interior of the stud being provided with an opening to install a cork and interior of the cork being provided with a fill hole; a wipe board, which is provided at bottom of the body, and interior of which is provided with at least one through-hole surrounding outside the stud of body; and a bottom lid, which is covered on the wipe board, and bottom of which is provided with a slot to latch with a nut, with interior of the nut being provided with a water-proof pillar, exterior of the nut being provided with a knob, the nut being locked on the stud of body by rotating the knob, and the water-proof pillar blocking the fill hole in the cork of body.

2. The multi-functional cleaning and neatening tool, according to claim 1, wherein bottom of the body is provided with at least one locking block, and the wipe board is provided with at least one slot to be engaged with the locking bock, allowing the body to be assembled with the wipe board.

3. The multi-functional cleaning and neatening tool, according to claim 1, wherein two sides of the body are provided respectively with a groove.

4. The multi-functional cleaning and neatening tool, according to claim 1, wherein interior of a concaved hole at the other end of body is locked with a water-proof plug, with cleaning solution being filled into the concaved hole when pulling out the water-proof plug.

5. The multi-functional cleaning and neatening tool, according to claim 1, wherein interior of a concaved hole at one end of body is provided with an indenter, an end of the indenter is extended into the body and is connected with a lift pump, an end of the lift pump is connected with an inlet pipe, and an end of the indenter is provided with an outlet pipe, with the indenter being compressed and released, such that cleaning solution inside the body enters into the lift pump through the inlet pipe, and then flows into the fill hole of cork through the outlet pipe of cork.

6. The multi-functional cleaning and neatening tool, according to claim 5, wherein the lift pump includes a lift seat, a lift head, a spring, a steel ball and a water pipe; a lower end of the lift head inside the lift seat being sheathed with the spring, bottom of the spring being connected with the steel ball which blocks at a cone-shape pipe opening at bottom of the lift pump, an end of the lift pump being transfixed with another spring and then penetrating the lift head to compress the spring, and the other end being connected to interior of the indenter.

* * * * *